March 18, 1947. A. W. KURTZ 2,417,422
MANIPULATABLE SERVICING SUPPORT
Filed Dec. 1, 1944 3 Sheets-Sheet 1

INVENTOR.
ALLEN W. KURTZ
BY William D. Hall.
ATTORNEY

March 18, 1947.  A. W. KURTZ  2,417,422
MANIPULATABLE SERVICING SUPPORT
Filed Dec. 1, 1944   3 Sheets-Sheet 2

INVENTOR.
ALLEN W. KURTZ
BY William D. Hall.
ATTORNEY

March 18, 1947. A. W. KURTZ 2,417,422
MANIPULATABLE SERVICING SUPPORT
Filed Dec. 1, 1944 3 Sheets-Sheet 3

INVENTOR.
ALLEN W. KURTZ
BY
William D. Hall.
ATTORNEY

Patented Mar. 18, 1947

2,417,422

UNITED STATES PATENT OFFICE 2,417,422

MANIPULATABLE SERVICING SUPPORT

Allen W. Kurtz, Springfield, Ohio, assignor to the Government of the United States of America, as represented by the Secretary of War Application December 1, 1944, Serial No. 566,170

2 Claims. (Cl. 248—194)

(Granted under the act of March 3, 1883, as amended April 30, 1928; 370 O. G. 757)

The invention described herein may be manufactured and used by or for the Government for governmental purposes, without the payment to me of any royalty thereon.

The invention to be hereinafter described relates to a test or servicing bench equipment.

In servicing any comparatively heavy or cumbersome equipment, where the servicing involves considerable handling there is always corresponding risk of damage to the equipment and injury to the personnel. This is greatly increased or magnified where radar equipment is involved, due to possible contact with the high voltage incident to the operation of the radar equipment. Of course, in any other equipment involving high voltage there would be similar risks to personnel.

The present invention has been developed to either eliminate or greatly minimize the above and other objections and provide a simple, efficient, compact equipment for supporting in any one of a great number of positions any one of a great variety of objects. As a simple, important and widely applicable use it has been shown as applied to radar servicing. It is in no sense limited to that use.

In order to more clearly disclose the construction, operation and use of the invention reference should be had to the accompanying drawings forming part of the present application.

Throughout the several figures of the drawings like reference characters designate the same parts in the different views.

Figure 1:
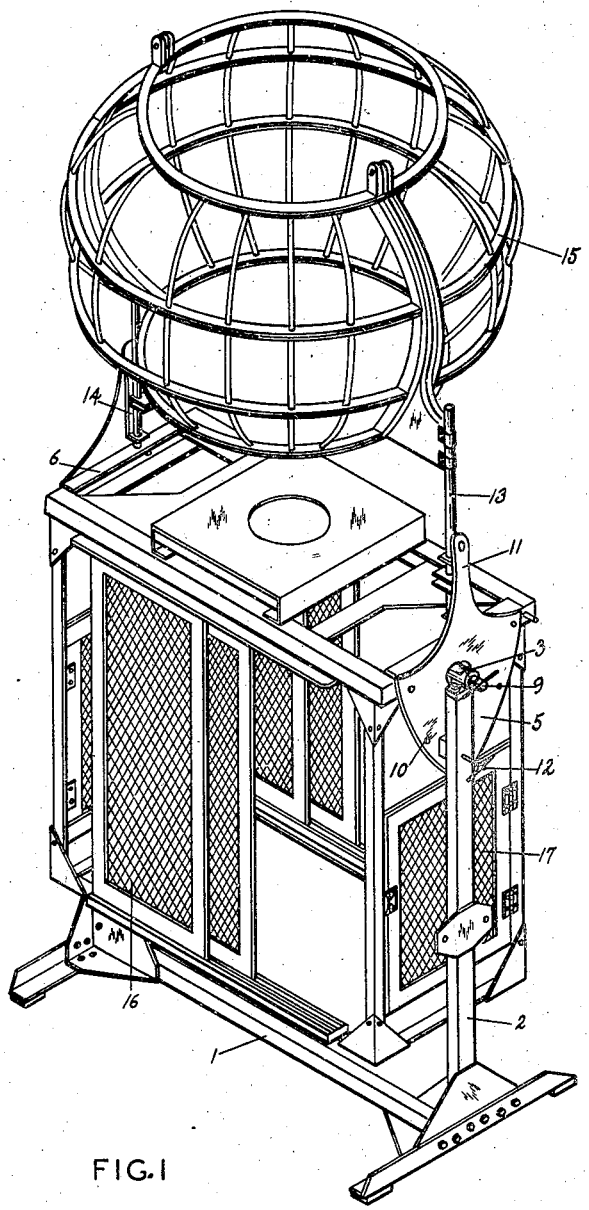
Fig. 1 is a perspective view of the invention applicable to servicing radar equipment.

Referring to the drawings in detail a suitable base of angles, channels or similar structural members is provided. A simple, acceptable and economical construction would provide a foot or ground member 1 preferably in the form of a very wide and very shallow letter H. At the intersection of the cross bar of the H with each respective side bar is securely mounted an upright, post, standard or leg 2. These posts may be made of any desired length or height, according to the use to which the test bench is to be put.

Journaled in a suitable bearing 3 mounted in any desired manner on the upper end of each post 2, is the short tubular shaft 4 fixed to plate 5. Each plate 5 is provided with a diametrically extending way or channel 6 shaped and adapted to freely receive one member of a frame 7 in which radar or any other equipment, apparatus, device or object may be mounted, secured or carried. It will be readily understood that the frame for any one piece of equipment, apparatus or device may or may not be practical and acceptable for another. Likewise, a very wide variety of such frames either have members readily receivable in such channels or may be very easily provided with the same.

Each shaft 4 is provided with a spring-washer retained axle pin 8 having limited longitudinal movement in 4 and provided with a threaded end projecting beyond disc 5 across the path of the channel or way 6. By providing the corresponding member of carrying frame 7 or the carrying frame 7 itself with a similar threaded hole or opening alignable with the opening through the way or channel 6, the frame member and plate 5 may be easily connected. Axle pin 8 may be easily unthreaded from operative position by handle 9.

Figure 2:
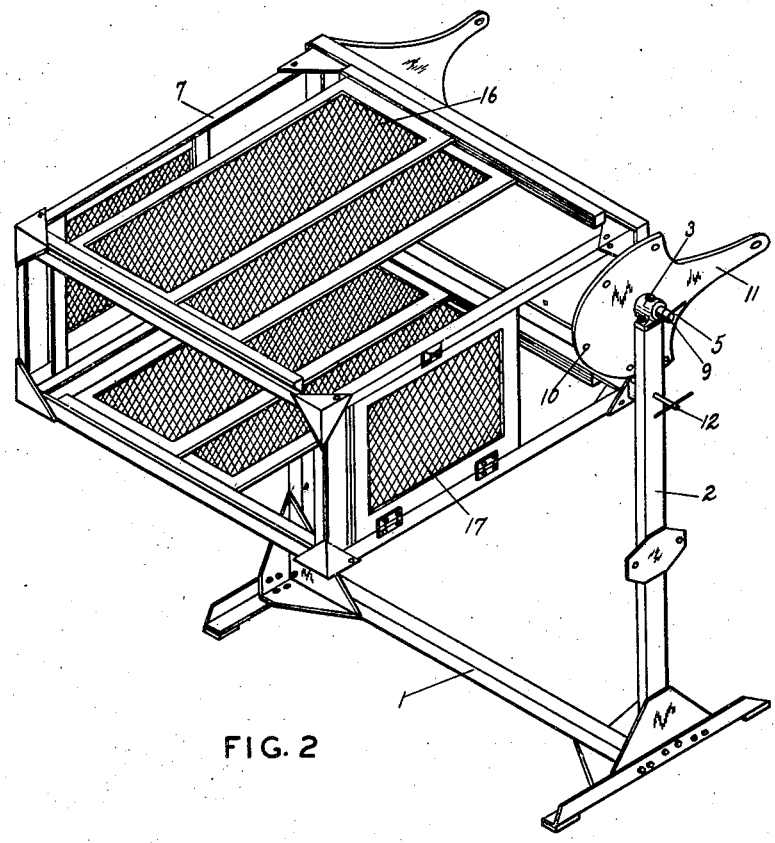
Fig. 2 is a perspective vertically rotated 90 degrees, the radar equipment and parts 13 to 15 being omitted.
Figure 3:
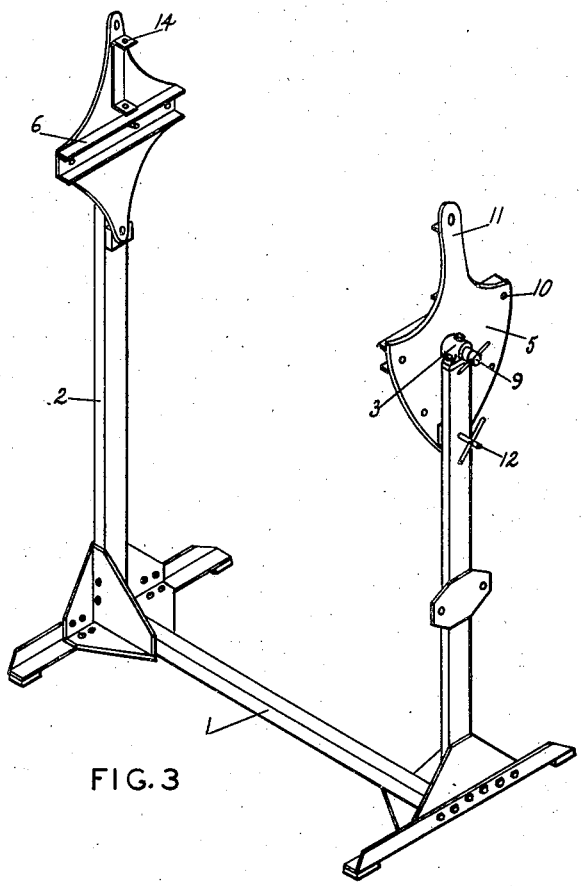
Fig. 3 is a perspective of the base, standard and immediately associated parts only.
Figure 4:
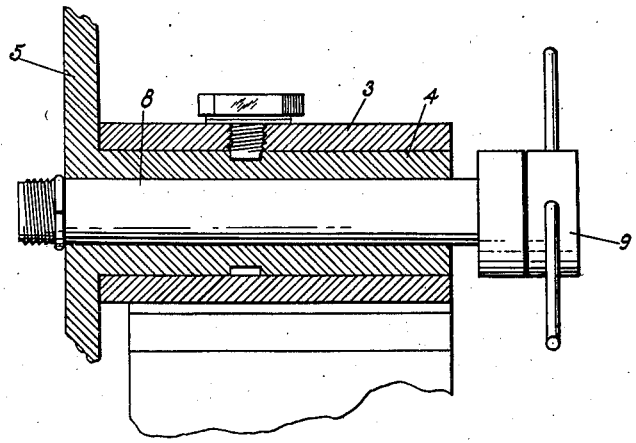
Fig. 4 is a fragmentary cross-section through the bearing.

When a given frame 7 has been thus secured in place in the ways of plates 5, it may be swung to any desired angular position about the horizontal axis passing through the aligned tubular bearing shafts 4 which constitute an axis of rotation about which the various apparatus, equipments, etc., may be revolved for better access during servicing. In order to secure particular equipment, etc., in a chosen position, plates 5 are provided with perforations 10 spaced at various distances about the circumference of the respective plate. As shown in the drawings, the perforations are about equidistantly spaced. This is a matter of predetermined arrangement or disposal. While the plates shown are approximately semi-circular discs having tubular bearings 4 at their diametric or radial centers, with a radial arm 11 substantially perpendicular to the straight edge, it will be well understood that any other type of disc or plate may be used, which will give the same adjustment. Cooperating with these discs is a locking pin or rod 12. Pin 12 may be threaded into and through post 2 in position to selectively seat in the particular hole 10 of plate 5. For instance, in the construction shown and described, pin 12 is locking the particular frame in a normal, or upright position in Fig. 1. In Fig. 2, the pin is securing the device in a position of 90 degrees rotation relative to Fig. 1. By rotating plate 5 to position to have pin 12 received in the perforations of arm 11, the frame may be locked in a position rotated 180 degrees from that of the position of Fig. 1. That would invert or turn upside-down, the particular frame and contained equipment. The construction and operation so far described provides a test bench usable with and adapted to a wide range of frames or supports for supporting during servicing or testing any of a great variety of equipment, apparatus and mechanisms.

In some cases, as in much radar equipment, there will be considerable parts extending beyond the supporting frame 7, when in normal position. This is illustrated in Fig. 1. To provide protection against damage to those parts while servicing and, at the same time, to protect the personnel from injury by contact with high voltages, auxiliary devices may be provided in extension of plates 5 and movable therewith. One form of such auxiliary devices comprises a pair of rods 13 removably seated in short metal brackets 14 mounted on the arms 11. These rods, in position, will adequately support a suitable cage or grill 15 adequately enclosing, shielding and protecting the extended equipment and preventing injury to personnel. Rods 13 may be maintained against possible sliding from brackets 14 by small clamps, set-screws or any other well known securing or holding means or devices, all of which are well known and need no further illustration or description here. Obviously, various other auxiliary means may be provided adapted to different types of equipment.

As a further protection to personnel where high voltages may be involved, as in servicing radar, for instance, the frame 7 which has been shown as rectangular or box like, is provided with sliding screen panels 16 and swinging screen doors 17. These sliding panels, swinging doors and the open bottom together with the means for securing the frame in the various positions, enable quick, easy access to any and every part of the equipment within the frame 7.

Where high voltages are not involved and there are no other serious or unusual risks or dangers to personnel there will not be the same or a corresponding need for the screen panels 16 or screen doors 17. In such cases an open frame 7 of simple structural members is ample for all purposes of inspection and servicing in a great many instances.

In accordance with the above it will be realized that the principal parts of the invention are the elements and structure represented by reference characters 1 to 12, inclusive. Such a test or servicing bench or support may be readily used under most conditions for an almost unlimited variety of equipment, apparatus and mechanisms in servicing or inspecting them.

It is thought that the construction, operation and use of the invention will be clear from the preceding detailed description.

Changes may be made in the construction, arrangement and disposition of the various parts of the invention within the scope of the appended claims without departing from the field of the invention and it is meant to include all such within this application wherein only a preferred form and one modification have been illustrated purely by way of example and with no thought or intention of, in any degree, limiting the invention thereby.

Having thus described my invention, what I claim and desire to protect by Letters Patent is:

1. A servicing bench equipment comprising a foot, upwardly extending posts carried thereby, bearings carried by said posts, tubular shafts revolubly journaled in said bearings and provided with annular locking channels, means extending through said bearings and into said channels and preventing longitudinal movement of said shafts in said bearings, frame receiving members carried by said shafts, axle pins extending through said tubular shafts and said frame receiving members and means carried by said axle pins for detachably connecting equipment thereto for servicing.

2. A servicing bench equipment comprising a foot, upwardly extending posts carried thereby, bearings carried by said posts, tubular shafts revolubly journaled in said bearings, plates carried by said shafts, frame receiving members carried by said shafts, rods for supporting auxiliary equipment, means yieldingly connecting said rods to said plates, axle pins extending through said tubular shafts and said frame receiving members and means carried by said axle pins for detachably connecting equipment thereto for servicing.

ALLEN W. KURTZ.

REFERENCES CITED

The following references are of record in the file of this patent:

UNITED STATES PATENTS

| Number | Name | Date |
|---|---|---|
| 2,354,955 | Lawrence | Aug. 1, 1944 |
| 609,412 | Coffey | Aug. 23, 1898 |
| 1,580,627 | Peterson | Apr. 13, 1926 |
| 2,333,450 | Staley | Nov. 2, 1943 |
| 1,600,835 | Manley | Sept. 21, 1926 |